United States Patent
Joo

(10) Patent No.: US 7,315,583 B2
(45) Date of Patent: Jan. 1, 2008

(54) DIGITAL SUBSCRIBER LINE (DSL) MODEMS SUPPORTING HIGH-SPEED UNIVERSAL SERIAL BUS (USB) INTERFACES AND RELATED METHODS AND COMPUTER PROGRAM PRODUCTS

(75) Inventor: Jin-Tae Joo, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 995 days.

(21) Appl. No.: 10/408,512

(22) Filed: Apr. 7, 2003

(65) Prior Publication Data

US 2003/0198178 A1 Oct. 23, 2003

(30) Foreign Application Priority Data

Apr. 18, 2002 (KR) .................. 10-2002-0021184

(51) Int. Cl.
*H03K 9/00* (2006.01)
(52) U.S. Cl. .................. 375/316; 375/355; 375/229; 375/354; 375/377; 714/758; 714/702; 710/22
(58) Field of Classification Search ................ 375/316, 375/354, 355, 229, 377; 714/755; 710/22
See application file for complete search history.

(56) References Cited

U.S. PATENT DOCUMENTS

| | | | | |
|---|---|---|---|---|
| 6,021,167 | A * | 2/2000 | Wu | ........................... 375/354 |
| 6,266,715 | B1 * | 7/2001 | Loyer et al. | .................. 710/22 |
| 6,272,209 | B1 * | 8/2001 | Bridger et al. | ........... 379/27.01 |
| 2003/0043945 | A1 * | 3/2003 | Mujica et al. | ............... 375/355 |

FOREIGN PATENT DOCUMENTS

KR 2000-0041290 7/2000

* cited by examiner

*Primary Examiner*—Chieh M. Fan
*Assistant Examiner*—Eva Zheng
(74) *Attorney, Agent, or Firm*—Myers Bigel Sibley & Sajovec PA

(57) ABSTRACT

The present invention provides asymmetric digital subscriber line (ADSL) modems including a discrete multitone (DMT) modem module. The DMT modem module includes a digital signal processor (DSP) configured to process control signals for initializing the ADSL modem during installation associated with a host device and transmit the processed control signals to a host controller of the host device.

28 Claims, 11 Drawing Sheets

Fig. 6A

| 0 | Interrupt Request Type |
|---|---|
| 1 | Address (L) |
| 2 | Address (H) |
| 3 | Data Size (160 Bytes) |
| 4 | Data (0) |
| 1 | Data (1) |
| l | l |
| 63 | Data (59) |

Interrupt Packet − 1

Fig. 6B

| 0 | Data (60) |
|---|---|
| 1 | Data (61) |
| l | l |
| l | l |
| l | l |
| l | l |
| 63 | Data (123) |

Interrupt Packet − 2

Fig. 6C

| 0 | Data (124) |
|---|---|
| 1 | Data (125) |
| \| | \| |
| 35 | Data (159) |
| 36 | |
| \| | |
| 63 | |

Interrupt Packet - 3

Fig. 7

| 0 | [h00] LS0 channel, [h01] LS1 channel |
|---|---|
| 1 | |
| 2 | |
| 3 | ATM Cell (53-byte) |
| 4 | |
| \| | |
| 53 | |

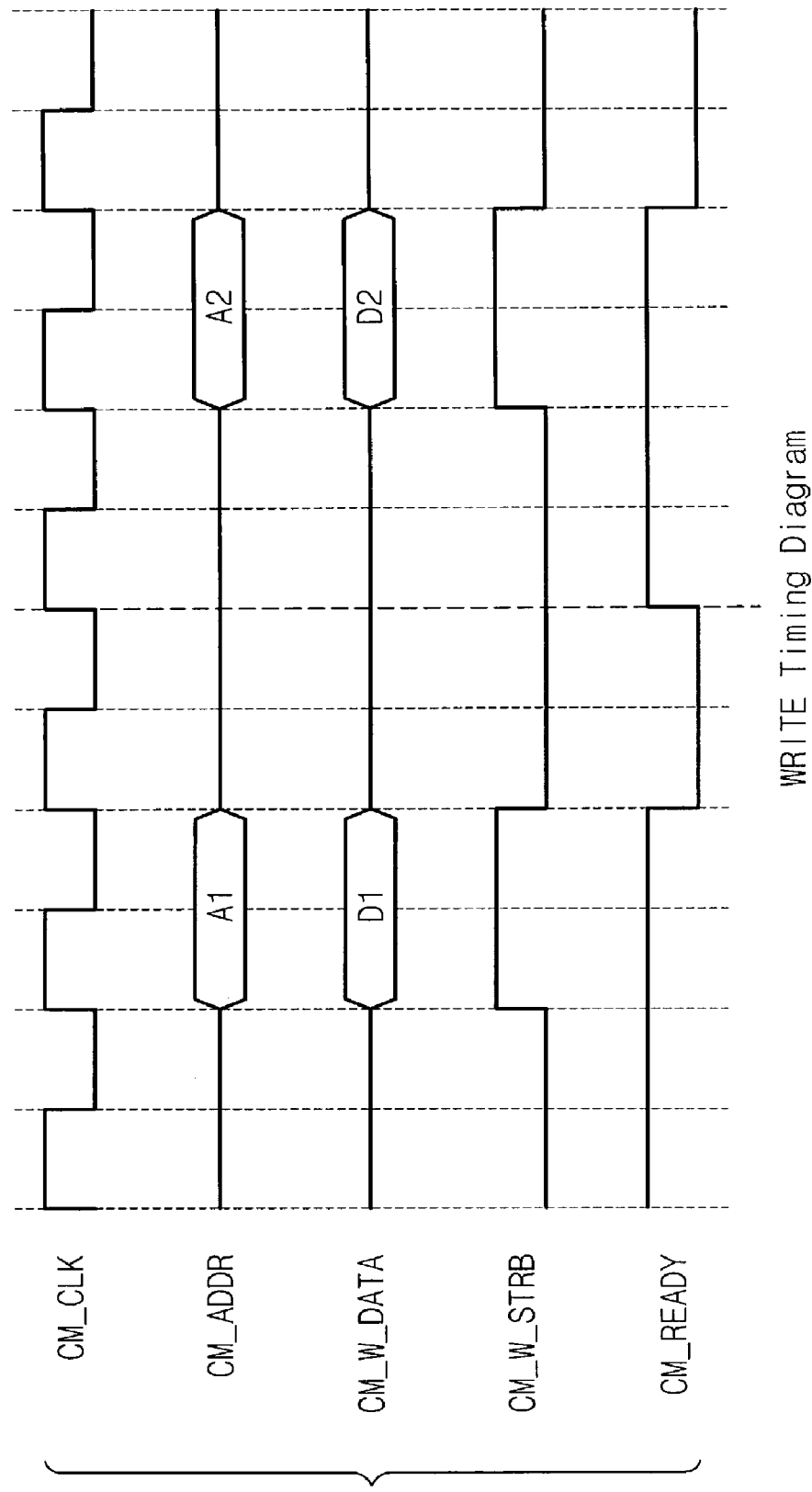

(DMT modem side)

(Host controller side)

DIGITAL SUBSCRIBER LINE (DSL) MODEMS SUPPORTING HIGH-SPEED UNIVERSAL SERIAL BUS (USB) INTERFACES AND RELATED METHODS AND COMPUTER PROGRAM PRODUCTS

RELATED APPLICATION

This application is related to and claims priority from Korean Application No. 2002-0021184, filed Apr. 18, 2002, the disclosure of which is hereby incorporated herein by reference.

FIELD OF THE INVENTION

The present invention relates to high speed network access technologies and, more particularly, to digital subscriber line (DSL) modems and related methods and computer program products.

BACKGROUND OF THE INVENTION

The demand for remote access to information sources and data retrieval, as evidenced by the success of services such as the World Wide Web, explains the increasing demand for high-speed network access technologies. Recent developments in internet technology, data compression technology, and so on, allow the real time transmission of data, voice/sound and video through a communication network.

The desire to transmit large amounts of information in a short amount of time may be provided by existing technologies, such as the Integrated Service Digital Network (ISDN), the cable modem network, and the digital subscriber line (DSL) network. In particular, ISDN permits simultaneous telephone and data communications, but may have a low data transmission rate. Cable modem networks may provide high data transmission rates, but these transmission rates may decrease as the network becomes crowded with users as the bandwidth of a cable modem network is shared. DSL may provide high data transmission rates, but may only be available in certain geographic regions.

An Asymmetric Digital Subscriber Line (ADSL) is a bi-directional/duplex communication medium that in which a small amount of bandwidth is allocated on the uplink. For example, data may be transmitted on the uplink at a transmission rate of about 640 Kbps. This small amount of bandwidth is typically sufficient for user requests or responses, which generally use a small amount of bandwidth. In contrast, ADSL typically allocates a relatively large amount of bandwidth on the downlink, where, for example, data can be transmitted to the user at a maximum rate of about 12 Mbps. The large amount of bandwidth allocated to the user on the downlink may be useful for many Internet applications, especially graphics or multimedia web data, where a large amount of downward bandwidth is preferred. Thus, for example, video, audio and 3-dimensional images can be transmitted via telephone lines to, for example, a TV set connected to a user's computer. In addition, a portion of the downlink bandwidth may concentrate on audio/speech, for example, a telephone call can also be supported without any extra lines. Unlike, for example, the high speed cable network, ADSL does not compete with other users for bandwidth, each user receives a dedicated line. To process digital data at high speeds, ADSL provides digital modulation and/or demodulation using discrete multitone (DMT) line coding.

Referring now to FIG. 1, a block diagram of a conventional ADSL system will be described. As illustrated in FIG. 1, an external ADSL modem 100 includes a network processor 102 for processing a communication protocol, a flash memory 104 for storing programs and data, a DMT modem 106 for modulating and/or demodulating data using DMT line coding and an analog front end (AFE) processor 108 for interfacing with a telephone line 116 and providing A/D and D/A conversion. As further illustrated, the ADSL modem 100 is electrically coupled to a personal computer (PC) 110 via an unshielded twisted pair cable 114. The PC 110 typically includes an Ethernet card 112 or an asynchronous transfer mode (ATM) card, which is a network card for managing Ethernet physical layer device (PHY) protocols and/or media access control (MAC) protocols. A network card is typically installed in the PC so that the PC can operate with a conventional ADSL modem. Furthermore, a network processor, for example, a microprocessor that supports a network protocol and flash memory are typically installed inside a conventional ADSL modem.

A universal serial bus (USB) is a standard interface used for peripheral equipment, such as a data communication cable, printer, scanner, keyboard, mouse, joystick, game pad, video camera, still image camera, modem, infrared device, ISDN adapter, Ethernet adapter, external storage unit and the like. A USB has a maximum transmission rate of about 12 Mbps. Therefore, including a USB port in an ADSL modem having a maximum downlink transmission rate of about 12 Mbps is common.

Referring now to FIG. 2, a block diagram of a conventional ADSL modem including a USB port will now be described. Referring to FIG. 2, a PC 210 supporting the USB port 212 is electrically coupled to a USB transceiver 218 via a USB cable, making an extra network card inside the PC unnecessary. However, to implement the USB protocol, the ADSL modem 200 typically includes a processor, such as a microcontroller module (MCU) 202, a memory module 204 and a software driver for controlling the processor. Thus, ADSL modems have increased in size and cost to accommodate the additional circuitry included to support the USB interface. Accordingly, improved ADSL modems including USB interfaces may be desirable.

SUMMARY OF THE INVENTION

Embodiments of the present invention provide asymmetric digital subscriber line (ADSL) modems including a discrete multitone (DMT) modem module. The DMT modem module includes a digital signal processor (DSP) configured to process control signals for initializing the ADSL modem during installation associated with a host device and transmit the processed control signals to a host controller of the host device.

In some embodiments of the present invention, the DMT modem module further includes a program memory. The DMT modem module may be configured to download firmware for operating the DMT modem module from the host controller and store the firmware in the program memory of the DMT modem module.

In further embodiments of the present invention, a DMT period may have a first portion and a second portion. The DSP may be further configured to process data signals during the first portion of the DMT period and process the control signals during the second portion of the DMT period. The second portion of the DMT period may be defined by a time remaining after the DSP has processed the data signals. The DMT period may be about 250 μs.

In still further embodiments of the present invention, the modem further includes a universal serial bus (USB) interface module (UIM) that may be configured to communicate with the host device through a USB transceiver. The UIM may be further configured to communicate with the DMT modem module through a data and/or control interface. The control signals may be communicated to the DSP through the UIM and the control interface.

In some embodiments of the present invention, the host device may communicate with the UIM through the transceiver using at least one of asynchronous transfer mode (ATM) data packets and/or synchronous transfer mode (STM) data packets.

In further embodiments of the present invention, the UIM may further include a first in first out (FIFO) buffer module including a plurality of endpoints. Each of the plurality of endpoints may have a data type selected from a plurality of data types associated therewith. The plurality of data types may include large-capacity data, real-time data, control data and/or interrupt data.

In still further embodiments of the present invention, the UIM may further include a data information storage register and a USB core unit module electrically coupled to the data information storage register. The USB core unit module may be configured to parse received data, store a data type of the received data, a transmission direction of the received data, an endpoint address associated with one of the plurality of endpoints and a data size of the received data in the data information storage register. The UIM may be further configured to extract a data packet from the received data and store the extracted data packet into one of the plurality of endpoints having the endpoint address stored in the data information storage register.

In some embodiments of the present invention, the UIM further includes a DMT interface module and a direct memory access (DMA) module electrically coupled to the DMT interface module. The DMA module may be configured to read the data packet from the endpoint having the endpoint address stored in the data information storage register, parse the data packet and transmit the parsed data packet to the DMT interface module. The DMT interface module may transmit the parsed data packet to the DMT modem module.

In further embodiments of the present invention, the DMT interface module may include a UTOPIA interface module, a control interface module and an EEPROM interface module. The UTOPIA interface module may be configured to communicate data packets to and from the DMT modem module. The control interface module may be configured to communicate control packets to and from the DMT modem module. The electrically erasable programmable read-only memory (EEPROM) interface module may be configured to read modem related information stored in an external EEPROM and transmit the information to the host controller. The UTOPIA interface module, the control interface module and the EEPROM interface module may share a single clock.

In still further embodiments of the present invention, the DMA module may be further configured to receive a second data packet from the DMT modem module through the DMT interface module, store the second data packet in one of the plurality of endpoints and provide an interrupt signal to the USB core unit module. The USB core unit module may be further configured to receive the interrupt signal from the DMA module, read the second data packet from the one of the plurality of endpoints and transmit the second data packet to the host device through the USB transceiver.

While the present invention is described above primarily with reference to ADSL modems, methods and computer program products for operating ADSL modems are also provided.

BRIEF DESCRIPTION OF THE DRAWINGS

FIGS. 6A to 6C are diagrams illustrating the contents of interrupt data packets used in ADSL modems according to some embodiments of the present invention;

FIG. 7 is a diagram illustrating the contents of bulk and isochronous data packets used in ADSL modems according to some embodiments of the present invention;

FIGS. 8A and 8B are timing diagrams illustrating operations of the ADSL modems according to some embodiments of the present.

DETAILED DESCRIPTION OF EMBODIMENTS OF THE PRESENT INVENTION

Figure 1:
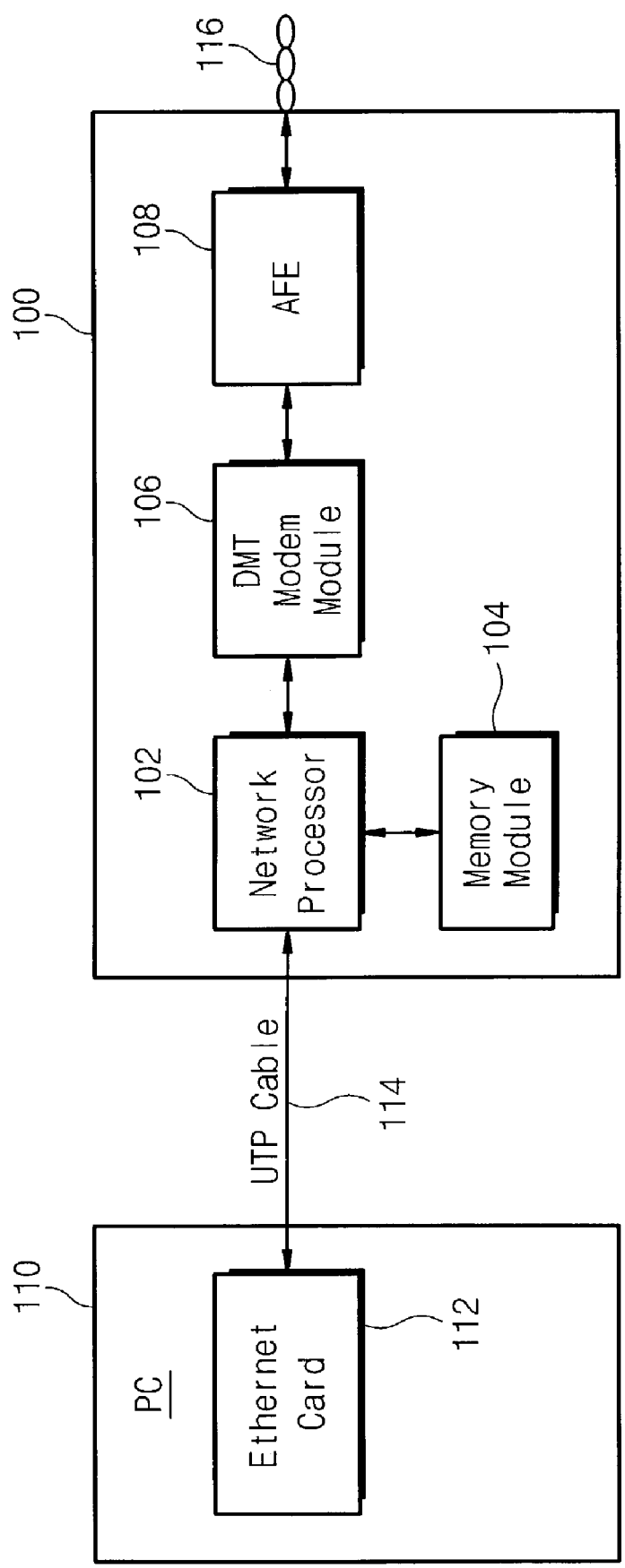
FIG. 1 is a block diagram illustrating conventional external ADSL modems.
Figure 2:
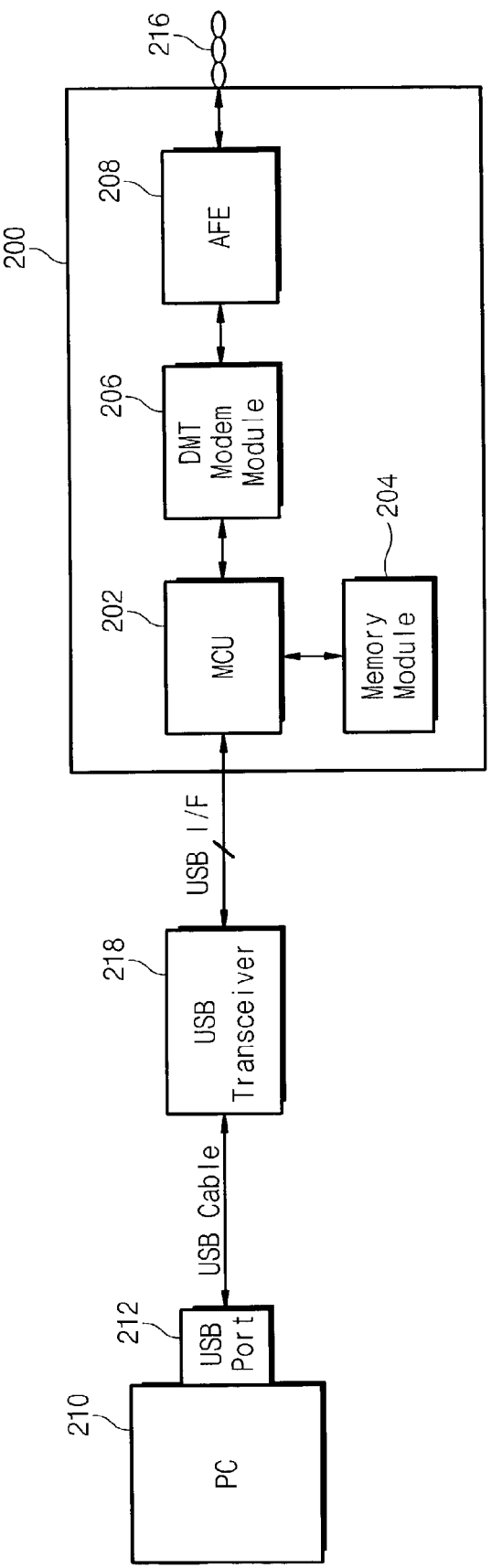
FIG. 2 is a block diagram illustrating conventional USB-ADSL modems including microcontroller modules.

The present invention now will be described more fully with reference to the accompanying drawings, in which embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like reference numerals refer to like elements throughout.

As will be appreciated by one of skill in the art, the present invention may be embodied as a method, modem, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be used including hard drives, CD-ROMs, optical storage devices, and/or magnetic storage devices.

Computer program code for carrying out operations of the present invention may be written in an object oriented programming language, such as Java® or C++. However, the computer program code for carrying out operations of the present invention may also be written in conventional procedural programming languages, such as the "C" programming language or assembly language. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

Embodiments of the present invention will be described below with respect to FIGS. 3 through 9B. Embodiments of the present invention provide asymmetric digital subscriber line (ADSL) modems including discrete multitone (DMT) modem modules. The DMT modem modules include digital signal processors (DSP) configured to process control signals for initializing the ADSL modems during installation associated with a host device, such as a personal computer (PC), and transmit the processed control signals to a host controller of the host device. In further embodiments of the present invention, the DSP may be further configured to download firmware that controls the operation of the DMT modem module from the host controller of the host device. Including a DSP in the DMT modem module that communicates with a host controller on a host device may provide an ADSL modem without an expensive microprocessor. Furthermore, downloading DMT modem module firmware from the host controller may reduce the likelihood of a need for flash memory in the ADSL modem. Accordingly, ADSL modems according to embodiments of the present invention, may be smaller and more cost effective than conventional ADSL modems.

Figure 3:
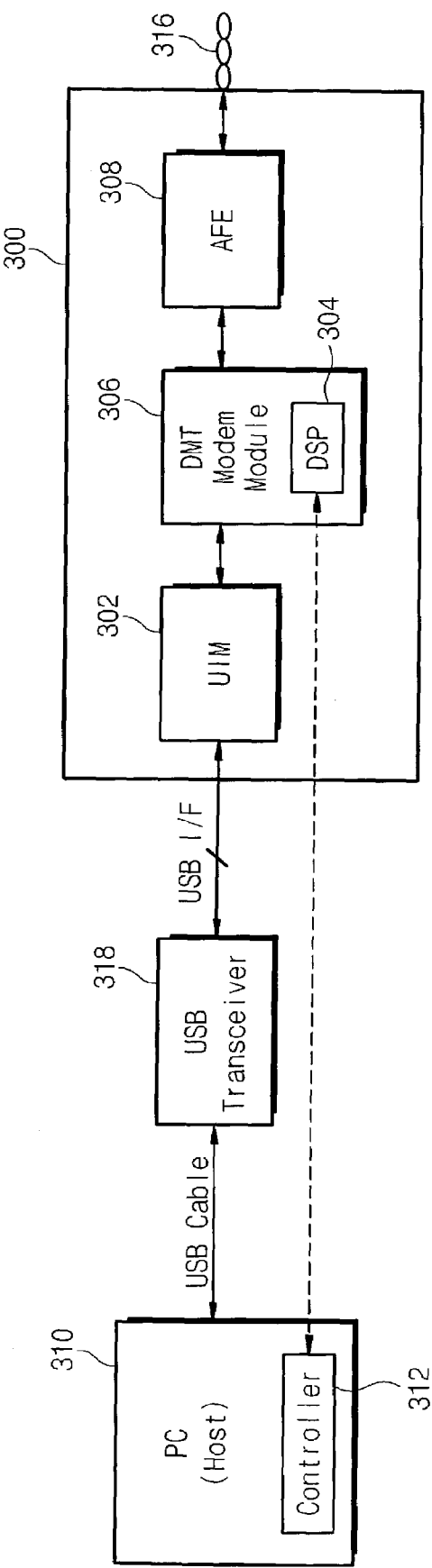
FIG. 3 is a block diagram illustrating systems including ADSL modems according to some embodiments of the present invention.

Referring now to FIG. 3 a block diagram of systems including ADSL modems according to some embodiments of the present invention, will now be discussed. As illustrated in FIG. 3, the ADSL modem 300 supports a high-speed universal serial bus (USB) interface. The ADSL modem 300 supporting the high-speed USB interface is electrically coupled to a host device, for example, a personal computer (PC) 310, supporting a USB via a USB transceiver 318. The USB transceiver 318 is a communication path between the host PC 310 and the ADSL modem 300. The USB transceiver 318 is electrically coupled to the host PC 310 via a USB port (not shown) of the host PC 310 and interfaces with the ADSL modem 300. The ADSL modem 300 includes a USB interface module (UIM) 302, a DMT modem module 306 including a digital signal processor (DSP) 304, and an analog front end processor (AFE) 308.

As further illustrated, the host PC 310 includes a host controller 312 providing a USB interface and communicates data using asynchronous transfer mode (ATM) or synchronous transfer mode (STM) data packets. In other words, the host PC 310 communicates with the ADSL modem 300 via the USB transceiver 318 using ATM or STM data packets. Furthermore, the host PC 310 interfaces with the DSP 304 of the DMT modem module 306 via the host controller 312. The host controller 312 of the host PC 310 manages the flow of data between the host PC 310 and the ADSL modem 300.

The UIM 302 processes the USB data received from the USB transceiver 318 and/or data received from the DMT modem module 306. The DMT modem module 306 modulates data transmitted from the UIM 302 using a digital modulation scheme and/or demodulates data received from the analog front end processor 308. The analog front end 308 converts digital signals output from the DMT modem module 306 into analog signals to transmit analog signals via, for example, a telephone line 316. In addition, the analog front end 308 converts analog signals received via, for example, the telephone line 316 into digital signals and transmits the digital signals to the DMT modem module 306. It will be understood that the configuration of elements in the system of FIG. 3 is provided for exemplary purposes only and embodiments of the present invention are not limited to this configuration.

Figure 4:
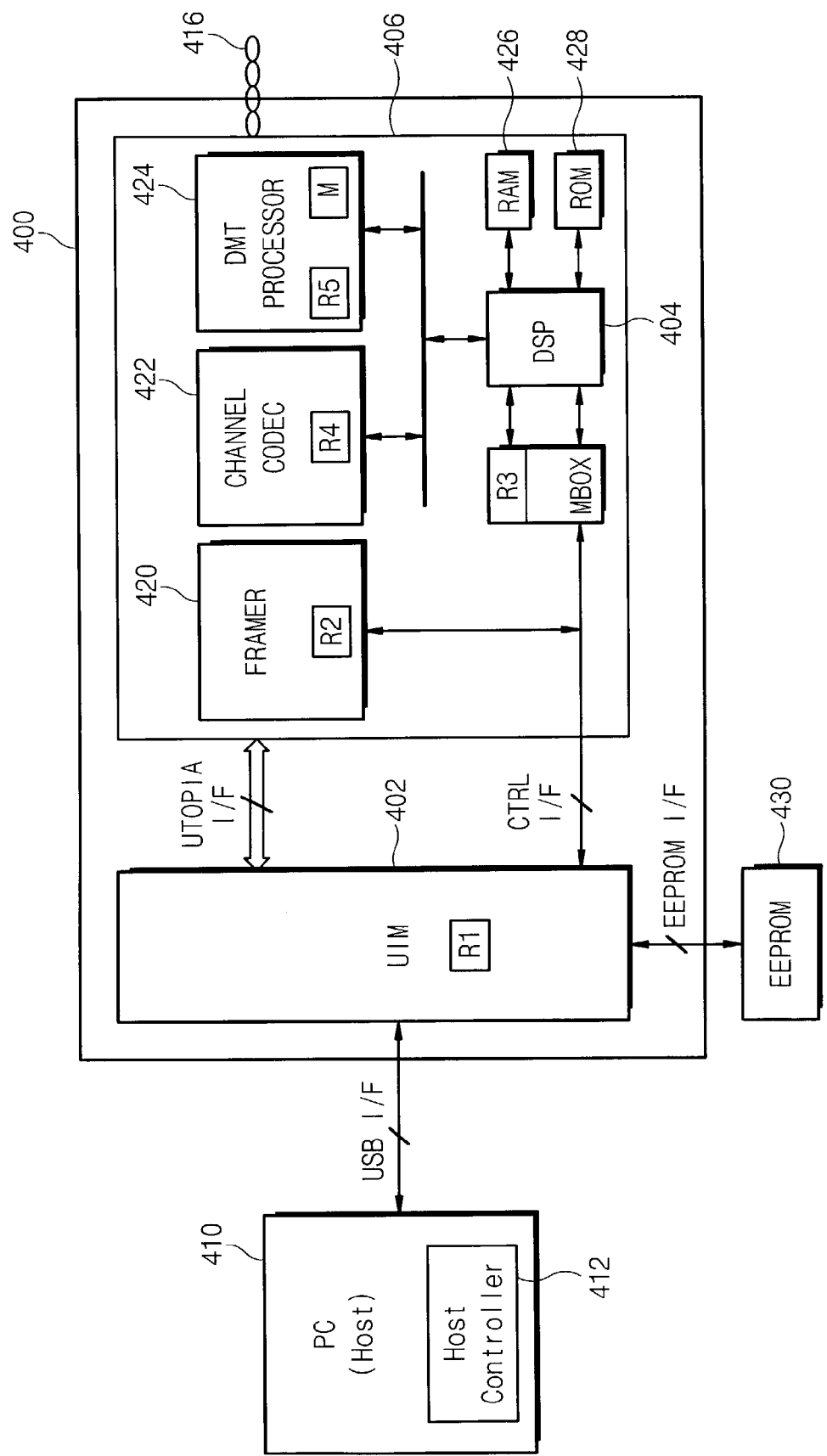
FIG. 4 is a block diagram illustrating systems including ADSL modems according to some embodiments of the present invention.

Referring now to FIG. 4, a block diagram illustrating systems including ADSL modems according to further embodiments of the present invention will be described. As illustrated in FIG. 4, an ADSL modem 400 including a USB interface communicates with a host device, for example, PC 410, which includes a host controller 412. A DMT modem module 406 includes a framer 420, a channel coder/decoder (CODEC) 422, a DMT processor 424, a DSP 404, a random access memory (RAM) 426, a read only memory (ROM) 428, a memory box MBOX, second through fifth registers R2, R3, R4 and R5 and a memory M. The framer 420 performs an ADSL framing function and a forward error check (FEC) interleave function. The framer 420 further includes the second register R2. The channel coder/decoder (CODEC) unit 422 encodes data output from the framer 420 and/or decodes data output from a DMT processor 424. The channel coder unit 422 further includes the fourth register R4. The DMT processor 424 performs an inverse fast Fourier transform and/or a fast Fourier transform for DMT modulation/demodulation, a filtering function and an echo cancellation function. The DMT processor 424 includes the fifth register R5 and the memory M. The register R3 and a memory box MBOX are used to interface between the host controller 412 and the DSP 404.

The DSP 404 is electrically coupled to the channel CODEC unit 422 and the DMT processor 424 and is configured to process the DMT modulation and/or demodulation schemes. The DMT modulation and/or demodulation is performed during a DMT symbol period, for example, a period of about 250 µs. The RAM 426 stores temporary data, and the ROM 428 stores firmware that controls the operation of the DMT modem module 406 that is downloaded from the host PC 410. As described above, the UIM 402 interfaces with the DMT modem module 406 and the host PC 410, and processes the USB protocol. As illustrated, the UIM 402 includes a first register R1.

The USB protocol includes multiple transaction types, for example, a bulk transaction type, an isochronous transaction type, a control transaction type and an interrupt transaction type. The bulk transaction type and the isochronous transaction type are used to transmit payload data. In particular, the bulk transaction type is used to transmit, for example, large-capacity data, such as, the output of printers or scanners. The isochronous transaction type is used to transmit, for example, real-time data such as audio, video and the like. The control transaction type is used to, for example, initialize a device, such as an ADSL modem, when the device is installed in the host PC. The interrupt transaction type is used, for example, to process periodic control commands between the host PC and the ADSL modem. It will be understood that the transaction types provided herein are provided for exemplary purposes only and embodiments of the present invention are not limited to these transaction types.

In certain embodiments of the present invention, the UIM 402 does not process the control signals of a control transaction type. Processing control signals may be more complicated relative to other transaction types and may have a relatively small limitation in processing time. Accordingly, the DSP 404 processes the control transaction. The control commands are transmitted to the DSP 404 via the memory box MBOX and the register R3 of the DMT modem module 406. The DSP 404 may perform the control transaction during a second portion of several DMT periods. The second portion of the DMT period is defined by the remaining time in the DMT period after the DMT modulation and/or demodulation has been completed (during a first portion of the DMT). A DMT period may be about 250 µs. Accordingly, processing the control signals in the DSP 404 may provide overall improved performance of the DMT modem module 406. Furthermore, processing the control signals in the DSP may obviate a need for an expensive microprocessor in ADSL modems in accordance with some embodiments of the present invention.

Furthermore, in some embodiments of the present invention firmware for operating the DMT modem module 406 is downloaded from the hard drive of the host PC 410 to the DSP 404 via the UIM 402. Thus, embodiments of the present invention using this functionality may not include a flash memory typically used in conventional external ADSL modems. Accordingly, a smaller, more cost effective ADSL modem may be provided.

Figure 5:
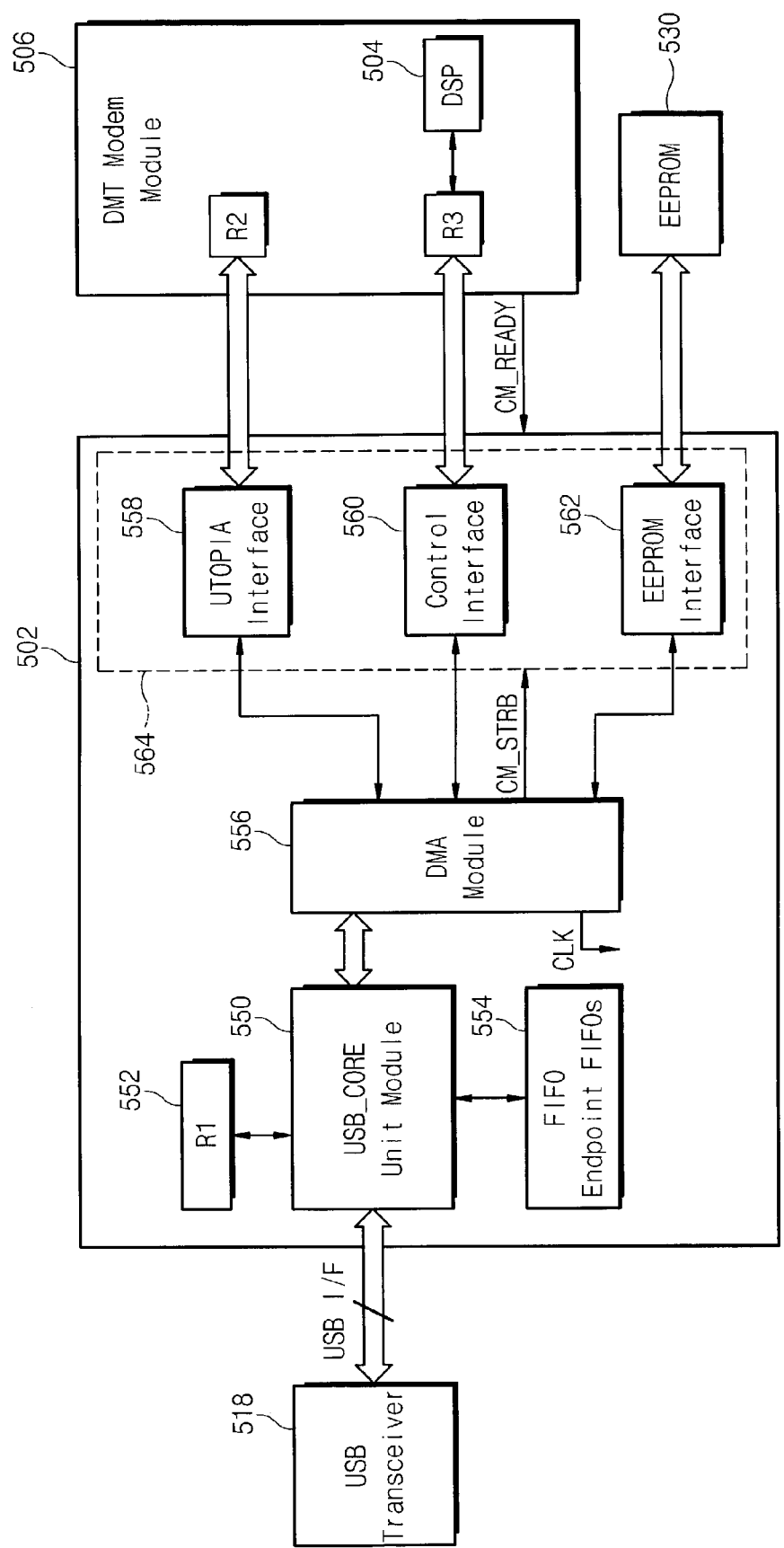
FIG. 5 is a block diagram illustrating USB interface modules (UIMs) of ADSL modems according to some embodiments of the present invention.

Referring now to FIG. 5, a block diagram illustrating UIMs of ADSL modems according to some embodiments of the present invention will be described. As illustrated in FIG. 5, the UIM 502 for processing the USB protocol according to embodiments of the present invention includes a USB core unit module 550, a first-in first-out (FIFO) buffer unit 554 having a plurality of endpoints, a direct memory access (DMA) module 556, a DMT interface module 564 and a data information storage register R1 552. The USB core unit module 550 may interface with a USB transceiver 518. The FIFO buffer unit 554 includes the plurality of endpoints, in which each one of the plurality of endpoints is associated with one of the USB transaction types discussed above. The DMT interface module 564 may include a UTOPIA interface module 558, a control interface module 560, and an electrically erasable programmable read-only memory (EEPROM) interface module 562.

The USB core unit module 550 is configured to parse serial data transmitted from the USB transceiver 518. The USB core unit module 550 further stores the type of the received data, a transmission direction, an endpoint address in the FIFO buffer unit 554 and a data size in the data information storage register R1 552. The USB core unit module 550 further extracts a data packet from the received data and stores the extracted data packet into one of the plurality of endpoints of the FIFO buffer unit 554 having the endpoint address stored in the data information register 552. The USB core unit module 550 provides an interrupt signal to the DMA module 556.

The FIFO buffer unit 554 allocates certain endpoints to particular transaction types. For example, an endpoint 0 (control FIFO, EP#0) may be allocated to control data (control transaction type), endpoints 1 and 2 (bulk FIFO, EP#1 and EP#2) may be allocated to large capacity data input and output, respectively (bulk transaction type), endpoints 3 and 4 (interrupt FIFO, EP#3 and EP#4) may be allocated to interrupt data input and output, respectively (interrupt transaction type) and endpoints 5 and 6 (isochronous FIFO, EP#5 and EP#6) may be allocated to real-time data input and output, respectively (isochronous transaction type). The endpoint allocated to control data (EP#0) can perform duplex transmission. Table 1 below illustrates respective sizes of the endpoints of the FIFO buffer unit 554 and the maximum packet sizes supported by the respective transaction types. It will be understood that the endpoint allocations and maximum packet sizes listed in Table 1 are provided for exemplary purposes only and that embodiments of the present invention are not limited to this configuration.

TABLE 1

Endpoint Addresses and Maximum Packet Size

| EP# | KIND OF ENDPOINT | DIRECTION | FIFO SIZE (BYTE) | MAX PACKET SIZE (BYTE) |
|---|---|---|---|---|
| 0 | CONTROL | IN/OUT | 8 × 18 | 16 |
| 1 | BULK | IN | 8 × 128 | 64 |
| 2 | BULK | OUT | 8 × 128 | 64 |
| 3 | INTERRUPT | IN | 8 × 64 | 64 |
| 4 | INTERRUPT | OUT | 8 × 64 | 64 |
| 5 | ISOCHRONOUS | IN | 8 × 64 | 64 |
| 6 | ISOCHRONOUS | OUT | 8 × 64 | 64 |

Now referring to FIGS. 6A to 6C, exemplary interrupt packet structures according to some embodiments of the present invention will be discussed. FIGS. 6A to 6C illustrate exemplary interrupt data packet structures for exchanging control data between the host controller and the DSP. In embodiments illustrated in FIGS. 6A to 6C, interrupt data having 160 bytes is transmitted. As illustrated, the interrupt data packet is divided into three interrupt packets, each capable of transmitting a maximum 64 bytes. As illustrated in FIG. 6A, a first interrupt packet includes four 1 byte headers and 60-bytes of data Data(0) to Data(59). The header areas may include a 1-byte interrupt request type, a 2-byte register address Address(H) and Address(L) within DMT modem module and a 1-byte transmission data size. As illustrated in FIGS. 6B and 6C, a second interrupt packet includes 64-bytes of data Data(60) to Data(123) and a third interrupt packet includes 36-bytes of data Data(124) to Data(159).

Now referring to FIG. 7, exemplary bulk and isochronous packet structures according to embodiments of the present invention will be discussed. As illustrated in FIG. 7, the data packet size is adaptable to, for example, an ATM cell. The packet includes a 1-byte path selection byte and a 53-byte ATM cell. The path selection byte may determine which path is used among an interleave path and a fast path. This decision is made by the ATM protocol.

Referring again to FIG. 5, the DMA module 556 may receive an interrupt signal from the USB core unit module 550. The DMA module 556 is configured to read the data packet from the corresponding endpoint of the FIFO buffer unit 554 according to the information stored in the data information register R1 552 and parse the data packet. The DMA module 556 is further configured to transmit the parsed data packet to the appropriate portion of the DMA interface module 564, i.e., the UTOPIA interface module 558, the control interface module 560 or the EEPROM interface module 562. The DMT interface module 564 transmits the data to the DMT modem module 506 or the external EEPROM 530.

For example, large capacity (bulk) or real-time data (isochronous) may be transmitted to the USB core unit module 550. The USB core unit 550 stores the data packet received from the host controller via the USB transceiver 518 into an appropriate endpoint and transmits an interrupt signal to the DMA module 556. The DMA module 556 receives the interrupt signal, reads the data packet from the input endpoint and parses the data packet. In particular, the DMA module 556 determines whether the data packet will be transmitted via the interleave path or via the fast path and transmits the data packet to the DMT modem module 506 via the UTOPIA interface module 558. The UTOPIA interface module 558 transmits the data packet to the DMT modem module 506 via a standard ATM interface, for example, UTOPIA level-2.

By way of further example, an interrupt signal is sent. The DMA module 556 receives the interrupt signal, reads data packet from the interrupt endpoint (EP#3) and parses the header contents of the interrupt packet. The DMA module 556 transmits the data packet to the DMT modem module 506 via the control interface module 560.

By way of still further example, when a control signal is transmitted the UIM 502 acts as a bridge and does not parse the contents of the data packet. In other words, the USB core unit module 550 stores the host control commands transmitted from the USB transceiver 518 into the control endpoint (EP#0) and transmits the interrupt signal to the DMA module 556. The DMA module 556 receives the interrupt signal, reads the data packet from the control endpoint (EP#0) and transmits it to the DSP 506 via the control interface module 560 without parsing the data packet. The DSP 506 parses the contents of the data packet, packs the data requested by the host controller into the data packet, and transmits the data packet to the UIM 502 again via the control interface module 560. The UIM 502 transmits the data packet to the host controller via the control endpoint (EP#0). In other words, in case of the control transaction, the UIM 502 acts as a bridge between the host controller and the DSP, and the DSP processes the control information.

As described above, the UTOPIA interface module 558 relates to a bulk transaction type and/or a isochronous transaction type and transmits data packets that are transmitted from the bulk endpoint (EP#1) or the isochronous endpoint (EP#5), to the DMT modem module 506. For example, in case where data is transmitted using ATM packets, ATM payload data transmitted via the bulk endpoint (EP#1) is transmitted to the DMT modem module 506 via a standard ATM interface, for example, UTOPIA level-2. The control interface module 560 supports a general host controller interface function and transmits control commands, which are transmitted from the host controller, to the DMT modem module 506 via the control endpoint (EP#0) and the interrupt endpoint (EP#3). Meanwhile, if there is a request of a host controller, the EEPROM interface module 562 reads out device-related information stored in the external EEPROM 530 and transmits them to the host controller. The device-related information may include a vendor ID, a serial number, a revision number and the like. The DMT interface module 564 also has a reverse interface function as discussed below.

Data transmission from the UIM to the DMT modem module is described above. Data may also flow in the reverse direction. Under control of the host controller, the DMA module 556 receives a data packet from the DMT modem module 506 via the DMT interface module 564, stores the received data packet into one of the plurality of endpoints of the FIFO buffer unit 554, and provides an interrupt signal to the USB core unit module 550. The USB core unit module 550 receives the interrupt signal from the DMA module 556, reads the data packet from the endpoint and transmits it to the host PC via the USB transceiver 518.

As described above, the DMA module 556 receives and/or transmits data from/to the DMT modem module 506 via the DMT interface module 564 of the UIM 502. The present invention provides a common interface that can be commonly utilized between the interface modules using the same clock regardless of data types and processing speeds. In other words, as shown in the timing diagrams of FIGS. 8A and 8B, the common interfaces are defined so as to exchange data between the DMA module 556 and the DMT modem module 506 via the DMT interface module 564.

Referring now to FIG. 8A, a timing diagram illustrating operations according to some embodiments of the present invention will be discussed. The timing diagram of FIG. 8A illustrates a write operation when data is transmitted from the DMA module 556 to the DMT modem module 506 via the DMT interface module 564. If the DMT modem module 506 acting as a slave is ready to receive data, i.e., if a common ready signal generator generates a common ready signal CM_READY at a logic high level, the DMA module 556 acting as a master transmits an address A1 and data D1 together with a strobe signal CM_W_STRB to the DMT modem module 506. After the DMT modem module 506 ascertains the strobe signal CM_W_STRB, the DMT modem module 506 sets the common ready signal CM_READY to a logic low level. If the data transmission is complete, the common ready signal generator again generates the common ready signal CM_READY at a logic high level, thereby setting the DMT modem module 506 to the ready level. Similarly, the DMA module 556 transmits an address A2 and data D2 together with the strobe signal CM_W_STRB, so that a new data transmission starts.

Figure 8B:
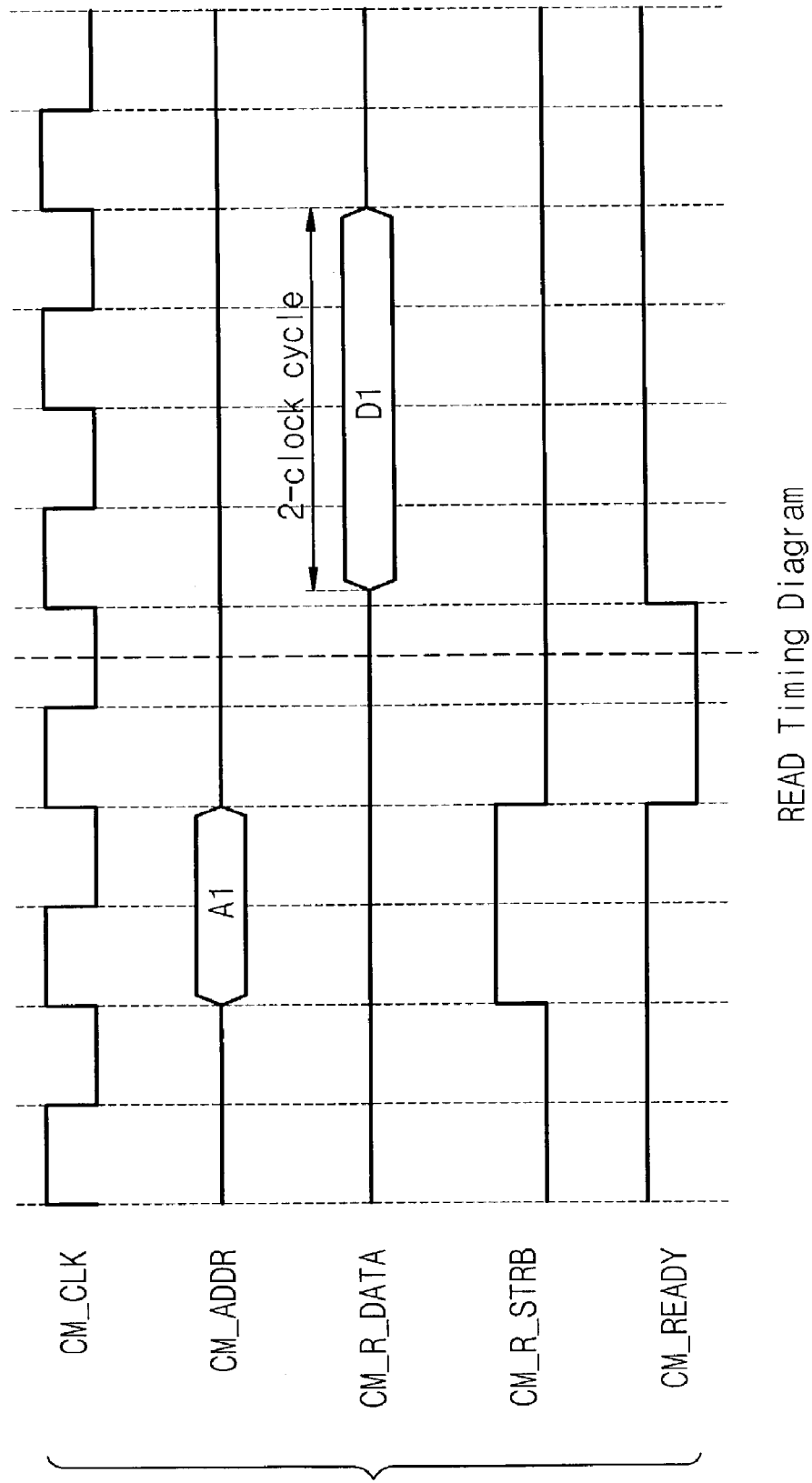

Referring now to FIG. 8B, a timing diagram illustrating operations according to embodiments of the present invention will be discussed. The timing diagram of FIG. 8B illustrates a read operation when the DMA module 556 receives data from the DMT modem module 506. If the DMT modem module 506 is ready, i.e., if the common ready signal CM_READY is at a logic high level, the DMA module 556 transmits an address A1 together with a strobe signal CM_R_STRB to the DMT modem module 506. After the DMT modem module 506 ascertains the strobe signal CM_R_STRB, the DMT modem module 506 sets the common ready signal CM_READY to a logic low level. If the process of transmitting the address A1 from the DMA module 556, acting as a master, is completed, the DMT modem module 506, acting as a slave, resets the common ready signal CM_READY to a logic high level. At this time, the data maintains at least a 2-clock cycle and the common ready signal CM_READY is set to a logic high level at a point when the data becomes valid.

Figure 9A:
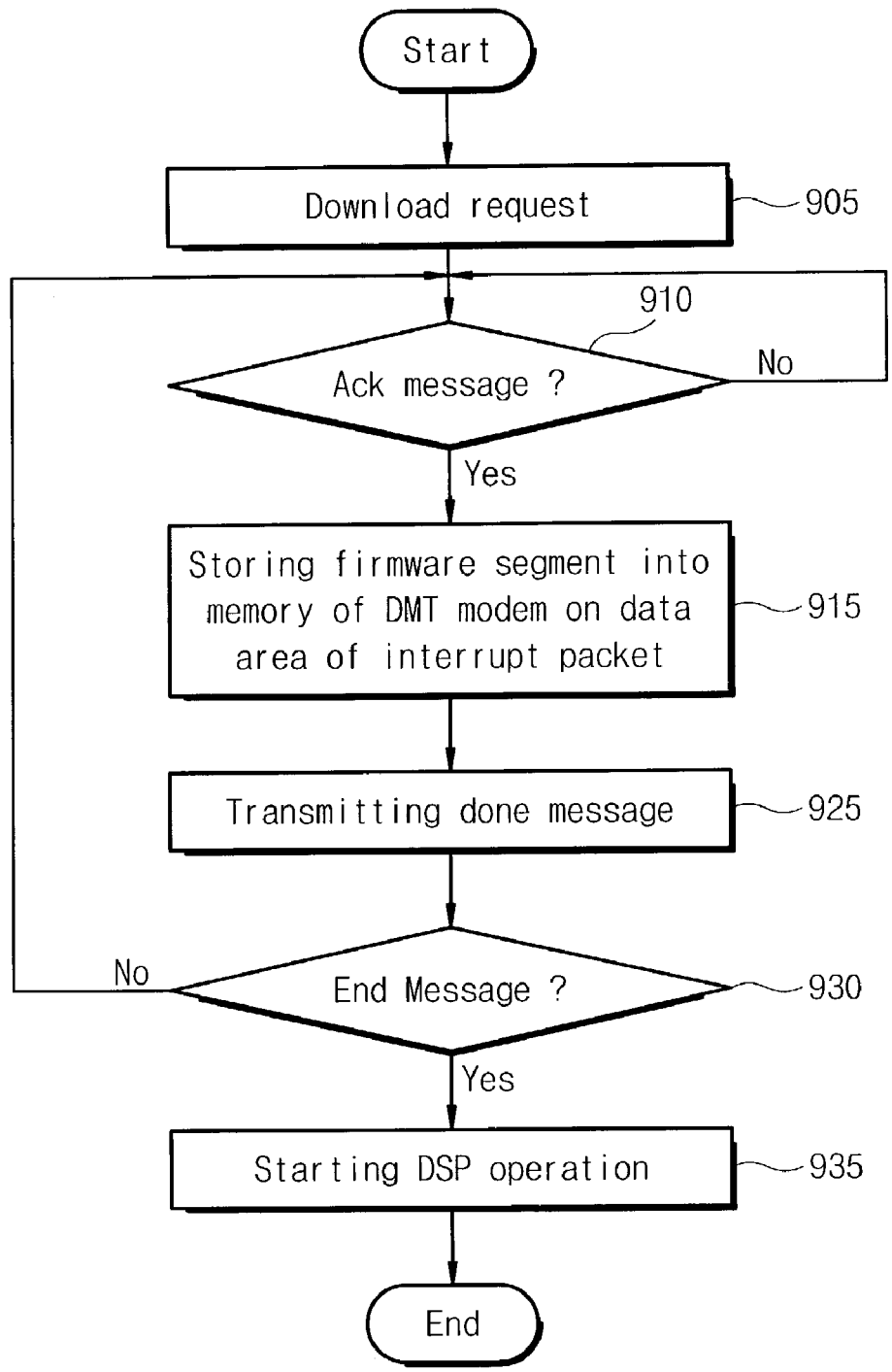
FIGS. 9A and 9B are flow charts illustrating operations for downloading firmware from the host controller to a Digital Signal Processor (DSP) according to some embodiments of the present invention.
Figure 9B:
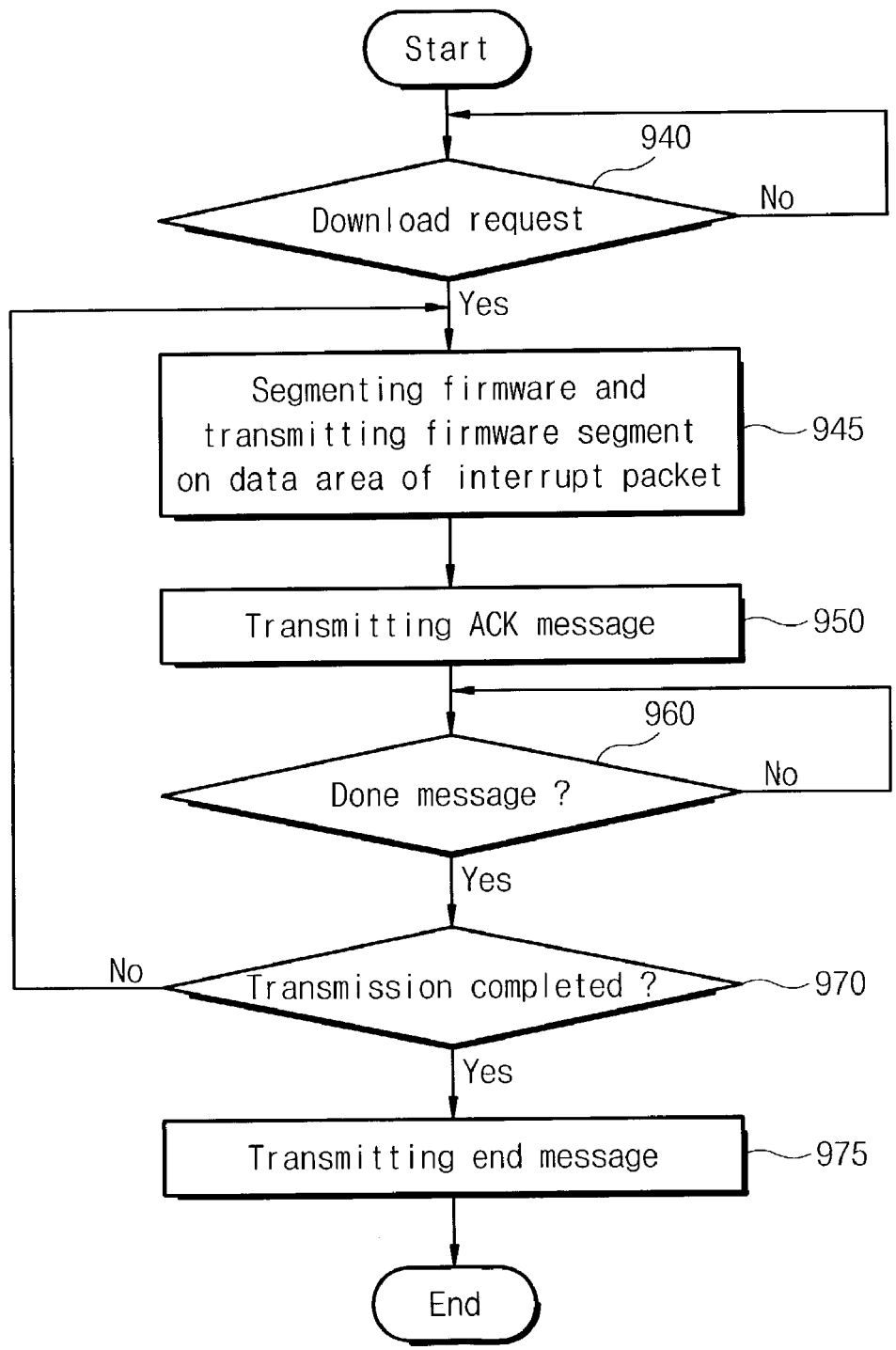

Referring now to FIGS. 9A and 9B, flow charts illustrating operations of the ADSL modem according to some embodiments of the present invention will be discussed. A protocol that is used to download firmware to control the operation of the DMT modem module and store the firmware into a program memory of the DMT modem module from the hard drive of the host PC via the UIM will be discussed. In embodiments of the present invention that download the firmware from the hard drive of the host PC, a flash memory installed in a conventional external ADSL modem may not be needed.

Referring now to FIG. 9A, operations of the DMT modem module during the download of the firmware will be discussed. The DMT modem module transmits a download request to the host controller (block 905). The DMT modem module determines if an acknowledgment (ACK) message has been received from the host controller (block 910). If it is determined that an acknowledgment has not been received from the host controller (block 910), the DMT modem module continues to wait for the acknowledgement message from the host controller. If, on the other hand, the DMT modem module determines that an acknowledgement message has been received from the host controller (block 910), the DMT modem module stores a firmware segment transmitted in a data payload portion of an interrupt packet into a program memory installed in the DMT modem module (block 915). The DMT modem module transmits a DONE message to the host controller, which indicates to the host controller that the DMT modem module is prepared to receive the next firmware segment (block 925). A determination is made if an end of message indication has been received from the host controller (block 930). If it is determined that an end message has not been received from the host controller (block 930), operations return to block 905 and repeat until it is determined that and end message has been received. If it is determined that an end message has been received (block 930), operations continue to block 935 where normal DSP operation is initiated.

Referring now to FIG. 9B, operations of the host controller during the download of the firmware will be discussed. A determination is made if a download request has been received from the DMT modem module (block 940). If it is determined that the host controller has not received a download request from the DMT modem module (block 940), the host controller continues to wait for the download request. If, on the other hand, it is determined that the host controller has received a download request from the DMT modem module (block 940), the host controller segments the entire firmware into packets having a predetermined size and transmits the first packet containing segmented firmware to the DMT modem module in the data payload area of the interrupt packet (block 945). The host controller also transmits an acknowledgment message to inform the DMT modem module that the first data packet including segmented firmware has been transmitted (block 950).

The host controller determines if a DONE message has been received from the DMT modem module (block 960). If it is determined that a DONE message has not been received (block 960), the host controller continues to wait for the DONE message. If it is determined that a DONE message has been received (block 960), it is determined if the entire firmware has been transmitted to the DMT modem module (block 970). If it is determined that the entire firmware has not been transmitted (block 970), operations return to block 945 and repeat until it is determined that the entire firmware has been transmitted. If, on the other hand, it is determined that the entire firmware has been transmitted (block 970), the host controller sends an end message to the DMT modem module (block 975).

An initialization process of the ADSL modem in accordance with embodiments of the present invention will now be described. The ADSL modem is powered on, the DMA module reads the device (ADSL modem) information from the external EEPROM via the EEPROM interface module and writes the device information to the control FIFO (EP#0). The DMA module transmits the interrupt signal to the host controller. The host controller receives the interrupt signal, reads the device information from the controller FIFO (EP#0) and assigns an address to the device. As a result, preparation for communication is completed. The control command between the host controller and the device is processed via the interrupt FIFO (EP#3, EP#4) at a period of 1 ms. As described above, the firmware is downloaded so as to operate the DMT modem. In other words, the DMA module downloads the firmware (DSP program) from the host controller via the interrupt FIFO and writes the downloaded firmware to the program memory of the DMT modem. Through the above procedures, a normal modem operation starts and thereafter the above-described bulk/isochronous transactions are achieved.

As described above with respect to FIGS. 3 through 9B, an ADSL modem is provided including a DMT modem module. The DMT modem module includes a DSP configured to process control signals for initializing the ADSL modem during installation associated with a host device and transmit the processed control signals to a host controller of the host device. In further embodiments, the DMT modem module the DMT modem module is further configured to download firmware for operating the DMT modem module from the host controller and store the firmware in a program memory of the DMT modem module. Thus, an expensive network processor may not be used because the CPU (host controller) of the host PC processes the portions that are processed by the network process of the conventional external ADSL modem. Furthermore, since the firmware can be downloaded from the hard drive of the host PC, flash memory may not be included in the ADSL modem. Accordingly, size and cost of the ADSL equipment can be reduced.

It will be understood that the block diagram illustrations of FIGS. 1 through 5 and combinations of blocks in the block diagrams may be implemented using discrete and integrated electronic circuits. It will also be appreciated that blocks of the block diagram of FIGS. 1 through 5 and combinations of blocks in the block diagrams may be implemented using components other than those illustrated in FIGS. 1 through 5, and that, in general, various blocks of the block diagrams and combinations of blocks in the block diagrams, may be implemented in special purpose hardware such as discrete analog and/or digital circuitry, combinations of integrated circuits or one or more application specific integrated circuits (ASICs).

Accordingly, blocks of the block diagrams of FIGS. 1 through 5 and the flowcharts of FIGS. 9A and 9B support electronic circuits and other means for performing the specified operations, as well as combinations of operations. It will be understood that the circuits and other means supported by each block and combinations of blocks can be implemented by special purpose hardware, software or firmware operating on special or general purpose data processors, or combinations thereof. It should also be noted that, in some alternative implementations, the operations noted in the flowcharts of FIGS. 9A and 9B may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An asymmetric digital subscriber line (ADSL) modem comprising a discrete multitone (DMT) modem module, the DMT modem module comprising a digital signal processor (DSP) configured to process control signals for initializing the ADSL modem during installation associated with a host device and transmit the processed control signals to a host controller of the host device,
    wherein the DMT modem module further comprises a program memory, wherein the DMT modem module is configured to download firmware for operating the DMT modem module from the host controller and store the firmware in the program memory of the DMT modem module; and
    wherein a DMT period has a first portion and a second portion, wherein the DMT modem module is further configured to process data signals during the first portion of the DMT period and wherein the DSP is configured to process the control signals during the second portion of the DMT period, the second portion of the DMT period being defined by a time remaining after the DMT modem module has processed the data signals.

2. The modem of claim 1 wherein the DMT period is 250 µs.

3. The modem of claim 1 further comprising a universal serial bus (USB) interface module (UIM) that is configured to communicate with the host device through a USB transceiver and communicate with the DMT modem module through a data and/or control interface, wherein the control signals are communicated to the DSP through the UIM and the control interface.

4. The modem of claim 3 wherein the host device communicates with the UIM through the transceiver using at least one of asynchronous transfer mode (ATM) data packets and/or synchronous transfer mode (STM) data packets.

5. The modem of claim 3 wherein the UIM further comprises a first in first out (FIFO) buffer module that comprises a plurality of endpoints, each of the plurality of endpoints having a data type selected from a plurality of data types associated therewith.

6. The modem of claim 5 wherein the plurality of data types comprises at least one of large-capacity data, real-time data, control data and/or interrupt data.

7. An asymmetric digital subscriber line (ADSL) modem comprising:
    a discrete multitone (DMT) modem module, the DMT modem module comprising a digital signal processor (DSP) configured to process control signals for initializing the ADSL modem during installation associated with a host device and transmit the processed control signals to a host controller of the host device, wherein the DMT modem module further comprises a program memory, wherein the DMT modem module is configured to download firmware for operating the DMT modem module from the host controller and store the firmware in the program memory of the DMT modem module; and
    a universal serial bus (USB) interface module (UIM) that is configured to communicate with the host device through a USB transceiver and communicate with the DMT modem module through a data and/or control interface, wherein the control signals are communicated to the DSP through the UIM and the control interface,
    wherein the UIM further comprises a first in first out (FIFO) buffer module that comprises a plurality of endpoints, each of the plurality of endpoints having a data type selected from a plurality of data types associated therewith; and
    wherein the UIM further comprises:
    a data information storage register; and
    a USB core unit module electrically coupled to the data information storage register, the USB core unit module being configured to parse received data, store a data type of the received data, a transmission direction of the received data, an endpoint address associated with one of the plurality of endpoints and a data size of the received data in the data information storage register, extract a data packet from the received data, and store the extracted data packet into one of the plurality of endpoints having the endpoint address stored in the data information storage register.

8. The modem of claim 7 wherein the UIM further comprises:
    a DMT interface module;
    a direct memory access (DMA) module electrically coupled to the interface module and configured to read the data packet from the endpoint having the endpoint address stored in the data information storage register, parse the data packet and transmit the parsed data packet to the DMT interface module, wherein the DMT interface module transmits the parsed data packet to the DMT modem module.

9. The modem of claim 8 wherein the DMT interface module comprises:
- a UTOPIA interface module that is configured to communicate data packets to and from the DMT modem module;
- a control interface module that is configured to communicate control packets to and from the DMT modem module; and
- an electrically erasable programmable read-only memory (EEPROM) interface module that is configured to read modem related information stored in an external EEPROM and transmit the information to the host controller.

10. The modem of claim 9 wherein the UTOPIA interface module, the control interface module and the EEPROM interface module share a single clock.

11. The modem of claim 9 wherein the DMA module is further configured to receive a second data packet from the DMT modem module through the DMT interface module, store the second data packet in one of the plurality of endpoints and provide an interrupt signal to the USB core unit module and wherein the USB core unit module is further configured to receive the interrupt signal from the DMA module, read the second data packet from the one of the plurality of endpoints and transmit the second data packet to the host device through the USB transceiver.

12. A method of operating an asymmetric digital subscriber line (ADSL) modem comprising:
- processing control signals for initializing the ADSL modem during installation using a discrete multitone (DMT) modem module that comprises a digital signal processor;
- transmitting the processed control signals to a host controller of a host device;
- downloading firmware for operating the DMT modem module to the DMT modem module from the host controller; and
- storing the firmware in a program memory of the DMT modem module,
- wherein a DMT period has a first portion and a second portion, the method further comprising processing data signals during the first portion of the DMT period, wherein processing the control signals further comprises processing the control signal during the second portion of the DMT period, the second portion of the DMT period being defined by a time remaining after the DMT modem module has processed the data signals.

13. The method of claim 12 further comprising:
- communicating between a host device and a universal serial bus interface module (UIM) through a USB transceiver; and
- communicating between the UIM and the DMT modem module through a data and/or control interface, wherein the control signals are communicated to the DSP through the UIM and the control interface.

14. A method of operating an asymmetric digital subscriber line (ADSL) modem comprising:
- processing control signals for initializing the ADSL modem during installation using a discrete multitone (DMT) modem module that comprises a digital signal processor;
- transmitting the processed control signals to a host controller of a host device;
- downloading firmware for operating the DMT modem module to the DMT modem module from the host controller;
- storing the firmware in a program memory of the DMT modem module,
- communicating between a host device and a universal serial bus interface module (UIM) through a USB transceiver;
- communicating between the UIM and the DMT modem module through a data and/or control interface, wherein the control signals are communicated to the DSP through the UIM and the control interface;
- receiving data at a USB core unit module;
- parsing the received data;
- storing a data type of the received data, a transmission direction of the received data, an endpoint address associated with one of the plurality of endpoints and a data size of the received data in a data information storage register;
- extracting a data packet from the received data; and
- storing the extracted data packet into one of a plurality of endpoints of a FIFO having the endpoint address stored in the data information storage register.

15. The method of claim 14 further comprising:
- reading the data packet from the endpoint of a FIFO having the endpoint address stored in the data information storage register at a DMA module;
- parsing the data packet; and
- transmitting the parsed data packet to a DMT interface module from the DMA module, wherein the DMT interface module transmits the parsed data packet to the DMT modem module.

16. The method according to claim 15 further comprising:
- receiving a second data packet from the DMT modem module at the DMA module through the DMT interface module;
- storing the second data packet in one of the plurality of endpoints;
- providing an interrupt signal to the USB core unit module;
- receiving the interrupt signal from the DMA module at the USB core unit module;
- reading the second data packet from the one of the plurality of endpoints; and
- transmitting the second data packet to the host device through the USB transceiver.

17. A computer program product for operating an ADSL modem, the computer program product comprising:
- a computer-readable storage medium having computer-readable program code embodied in said medium, said computer-readable program code comprising:
- computer-readable program code that processes control signals for initializing the ADSL modem during installation using a discrete multitone (DMT) modem module that comprises a digital signal processor (DSP);
- computer-readable program code that transmits the processed control signals to a host controller of a host device;
- computer-readable program code that downloads firmware for operating the DMT modem module to the DMT modem module from the host controller; and
- computer-readable program code that stores the firmware in a program memory of the DMT modem module,
- wherein a DMT period has a first portion and a second portion, the method further comprising processing data signals during the first portion of the DMT period, wherein processing the control signals further comprises processing the control signal during the second portion of the DMT period, the second portion of the DMT period being defined by a time remaining after the DMT modem module has processed the data signals.

18. The computer program product of claim 17 further comprising:
   computer-readable program code that communicates between a host device and a universal serial bus (USB) interface module (UIM) through a USB transceiver; and
   computer-readable program code that communicates between the UN and the DMT modem module through a data and/or control interface, wherein the control signals are communicated to the DSP through the UIM and the control interface.

19. A computer program product for operating an ADSL modem, the computer program product comprising:
   a computer-readable storage medium having computer-readable program code embodied in said medium, said computer-readable program code comprising:
   computer-readable program code that processes control signals for initializing the ADSL modem during installation using a discrete multitone (DMT) modem module that comprises a digital signal processor (DSP);
   computer-readable program code that transmits the processed control signals to a host controller of a host device
   computer-readable program code that communicates between a host device and a universal serial bus (USB) interface module (UIM) through a USB transceiver;
   computer-readable program code that communicates between the UIM and the DMT modem module through a data and/or control interface, wherein the control signals are communicated to the DSP through the UIM and the control interface;
   computer-readable program code that receives data at a USB core unit module;
   computer-readable program code that parses the received data;
   computer-readable program code that stores a data type of the received data, a transmission direction o F the received data, an endpoint address associated with one of the plurality of endpoints and a data size of the received data in a data information storage register;
   computer-readable program code that extracts a data packet from the received data; and
   computer-readable program code that stores the extracted data packet into one of a plurality of endpoints of a FIFO having the endpoint address stored in the data information storage register.

20. The computer program product claim 19 further comprising:
   computer-readable program code that reads the data packet from the endpoint of a FIFO having the endpoint address stored in the data information storage register at a DMA module;
   computer-readable program code that parses the data packet; and
   computer-readable program code that transmits the parsed data packet to a DMT interface module from the DMA module, wherein the DMT interface module transmits the parsed data packet to the DMT modem module.

21. The computer program product according to claim 20 further comprising:
   computer-readable program product that receives a second data packet from the DMT modem module at the DMA module through the DMT interface module;
   computer-readable program code that stores the second data packet in one of the plurality of endpoints;
   provides an interrupt signal to the USB core unit module;
   computer-readable program code that receives the interrupt signal from the DMA module at the USB core unit module;
   computer-readable program code that reads the second data packet from the one of the plurality of endpoints; and
   computer-readable program code that transmits the second data packet to the host device through the USB transceiver.

22. A digital subscriber line (DSL) modem supporting a USB interface, the DSL modem comprising:
   a USB interface module (UIM) for interfacing with a USB transceiver electrically coupled to a host controller and processing a USB protocol, the USB transceiver managing a USB data transmission; and
   a discrete multitone (DMT) modem for interfacing with the UIM and modulating and/or demodulating transmission and/or reception data under a control of a digital signal processor (DSP);
   wherein the UIM includes a USB core unit module, a direct memory access (DMA) module, a FIFO unit and a DMT interface module for providing an interface to the DMT modem, the USB core unit module storing data information from serial data transmitted from the USB transceiver, extracting and/or storing a data packet, and transmitting the data packet stored in the FIFO unit by the DMA module to the USB transceiver, the DMA module receiving an interrupt signal from the USB core unit module and extracting the data packet stored in the FIFO unit to transmit the extracted data packet to the DMT modem via the DMT interface module, or reading out data from the DMT modem and storing the read data into the FIFO unit via the DMT interface module.

23. The DSL modem of claim 22, wherein the FIFO unit includes bi-directional control endpoint defined according to USB protocol transaction types, urn-directional input/output bulk endpoints, uni-directional input/output interrupt endpoints and urn-directional input/output isochronous endpoints, and wherein the DMT interface module comprises:
   a UTOPIA interface module for transmitting the data transmitted via the bulk endpoint and the isochronous endpoint to the DMT modem via a standard ATM interface or transmitting the data in a reverse direction;
   an interface module for supporting the host controller interface and transmitting the control command transmitted from the host controller via the control endpoint and the interrupt endpoint to the DMT modem or transmitting the control command in a reverse direction; and
   a device information interface module for reading out device-related information stored in an external EEPROM and transmitting the device-related information to the host controller.

24. The DSL modem of claim 23, wherein the control transaction among the USB protocol transactions is transmitted to the DSP of the DMT modem via the control interface module without parsing the control command by the host controller, and the DSP parses the control command, packs information required by the host controller and transmits the packed information to the host controller via the UIM.

25. The DSL modem of claim 24, wherein the data exchange between the DMA module and the DMT modem via the DMT interface module is performed by a common interface regardless of to-be-processed data type and processing speed.

26. The DSL modem of claim 25 wherein the DMA module further comprises a common clock (CM_CLK) generation unit and a common write/read strobe signal (CM_W_STRB and CM_R_STRB) generation unit; wherein the DMT modem further comprises a common ready signal (CM_READY) generation unit, wherein the common ready signal (CM_READY) is a high level, the DMA module transmits an address and data together with the common write strobe signal (CM_W_STRB) to the DMT modem, wherein the common ready signal (CM_READY) is set to a low level and the data transmission is completed, the common ready signal (CM_READY) is set to a high level, wherein the common ready signal (CM_READY) signal is a high level, the DMA transmits an address together with the common read strobe signal (CM_R_STRB) to the DMT modem, and wherein the DMT modem ascertains the common read strobe signal (CM_R_STRB), the common ready signal (CM_READY) is maintained at a low level and is set to a high level when the data becomes valid while the data read maintains at least a 2-clock cycle and the common ready signal CM_READY is set to a high level.

27. The DSL modem of claim 26, wherein the control transaction is processed using the remaining time during a DMT period after a DMT modem algorithm is processed.

28. The DSL modem of claim 27, wherein firmware required for an operation of the DMT modem is downloaded from the host controller via the UIM and stored in a program memory of the DMT modem.

* * * * *

UNITED STATES PATENT AND TRADEMARK OFFICE
CERTIFICATE OF CORRECTION

PATENT NO.        : 7,315,583 B2                                Page 1 of 1
APPLICATION NO.   : 10/408512
DATED             : January 1, 2008
INVENTOR(S)       : Joo It is certified that error appears in the above-identified patent and that said Letters Patent is hereby corrected as shown below:

Column 17, Claim 18, Line 11:  Please correct "UN"
                               To read -- UIM --

Column 17, Claim 19, Line 41:  Please correct "direction o F the"
                               To read -- direction of the --

Column 18, Claim 23, Line 40:  Please correct "urn-directional"
                               To read -- uni-directional --

Column 18, Claim 23, Line 42:  Please correct "urn-directional"
                               To read -- uni-directional --

Column 18, Claim 23, Line 46:  Please correct "modern"
                               To read -- modem --

Signed and Sealed this

Thirteenth Day of May, 2008

JON W. DUDAS
*Director of the United States Patent and Trademark Office*